US008589370B2

(12) United States Patent
Feng et al.

(10) Patent No.: US 8,589,370 B2
(45) Date of Patent: Nov. 19, 2013

(54) ACRONYM EXTRACTION

(75) Inventors: Shi-Cong Feng, Beijing (CN); Yuhong Xiong, Mountain View, CA (US); Wei Liu, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/382,094

(22) PCT Filed: Jul. 16, 2009

(86) PCT No.: PCT/CN2009/072782
§ 371 (c)(1),
(2), (4) Date: Jan. 3, 2012

(87) PCT Pub. No.: WO2011/006300
PCT Pub. Date: Jan. 20, 2011

(65) Prior Publication Data
US 2012/0109974 A1 May 3, 2012

(51) Int. Cl.
G06F 17/30 (2006.01)
(52) U.S. Cl.
USPC .......................................... 707/705; 707/748
(58) Field of Classification Search
USPC ............................................ 707/705, 748
See application file for complete search history.

(56) References Cited

U.S. PATENT DOCUMENTS

| 7,296,229 B2* | 11/2007 | Berstis .......................... 715/259 |
| 7,788,125 B2* | 8/2010 | Greenfield et al. .......... 705/7.29 |
| 8,041,687 B2* | 10/2011 | Chen et al. .................... 707/690 |
| 8,156,505 B2* | 4/2012 | Venkatanna et al. .......... 719/313 |
| 8,190,997 B2* | 5/2012 | Shellen et al. ................ 715/733 |
| 8,392,884 B2* | 3/2013 | Specchio et al. .............. 717/124 |
| 2002/0152064 A1 | 10/2002 | Dutta et al. |
| 2007/0220037 A1* | 9/2007 | Srivastava et al. ............ 707/102 |
| 2008/0033714 A1 | 2/2008 | Gupta |

FOREIGN PATENT DOCUMENTS

CN          1725757 A          1/2006

OTHER PUBLICATIONS

L. Page et al., Technical Report, "The PageRank Citation Ranking: Bringing Order to the Web," 1998 (17 pages).

* cited by examiner

*Primary Examiner* — Kim Nguyen

(57) ABSTRACT

Disclosed is a system and computer-implemented method for extracting an acronym and one or more corresponding expansions of the acronym from a document represented in a markup language. The computer-implemented method comprises: identifying at least one acronym contained in the document; determining one or more expansions of the at least one identified acronym based on a portion of document located proximate the identified acronym; determining a ranking for each determined expansion based attributes of the document; and selecting one or more expansions for an identified acronym using the determined rankings.

11 Claims, 2 Drawing Sheets

ACRONYM EXTRACTION

An acronym is a word that is formed from the initial letter or letters of each component of a compound term or phrase (e.g., NATO, RADAR, SNAFU, etc.), while an abbreviation is a shortened form of a written word or phrase that is used or substituted for the whole word (e.g., "amt" is an abbreviation for amount). Acronyms and abbreviations tend to overlap and are frequently used in daily verbal discourse, in written documents and in electronic documents and web pages on the Internet. In certain communities (e.g., military, engineering, medicine, etc.), numerous acronyms are employed constantly. For example, a page of a military document commonly includes in excess of ten acronyms.

Acronyms present challenges to readers in several manners. In particular, individuals unfamiliar with a certain acronym may have difficulty understanding the acronym and using the acronym in vocabulary. For example, commonly known acronyms, such as "LASER" and "CDROM", are widely understood, while infrequently used or subject specific acronyms may be difficult for readers to understand (e.g., "AABFS" for Amphibious Assault Bulk Fuel System).

In many cases, a single acronym may correspond to a plurality of completely different terms, therefore resulting in confusion and ambiguity. Furthermore, acronyms are typically highly context dependent. For example, each company may have its own system of acronyms.

Various systems for acronym expansion are known. For example, the "AcronymFinder" system enables access to a manually compiled list of acronyms on the Internet. This system receives manual submissions of acronyms and corresponding expansions to update the list. However, such prior art systems suffer from several disadvantages. In particular, the AcronymFinder system is highly inefficient due to the list being generated by manual submissions. Further, the list is typically generic and static and may not suit or be tailored to various needs of particular organizations.

Although known systems extract acronyms and corresponding expansions, the results produced by these systems have limited accuracy. This tends to frustrate readers since the systems may omit acronyms within text or provide incorrect expansions for the acronyms, thereby requiring the reader to perform an additional task of ascertaining the correct expansion in another manner (e.g., manually).

BRIEF DESCRIPTION OF THE EMBODIMENTS

Figure 1:
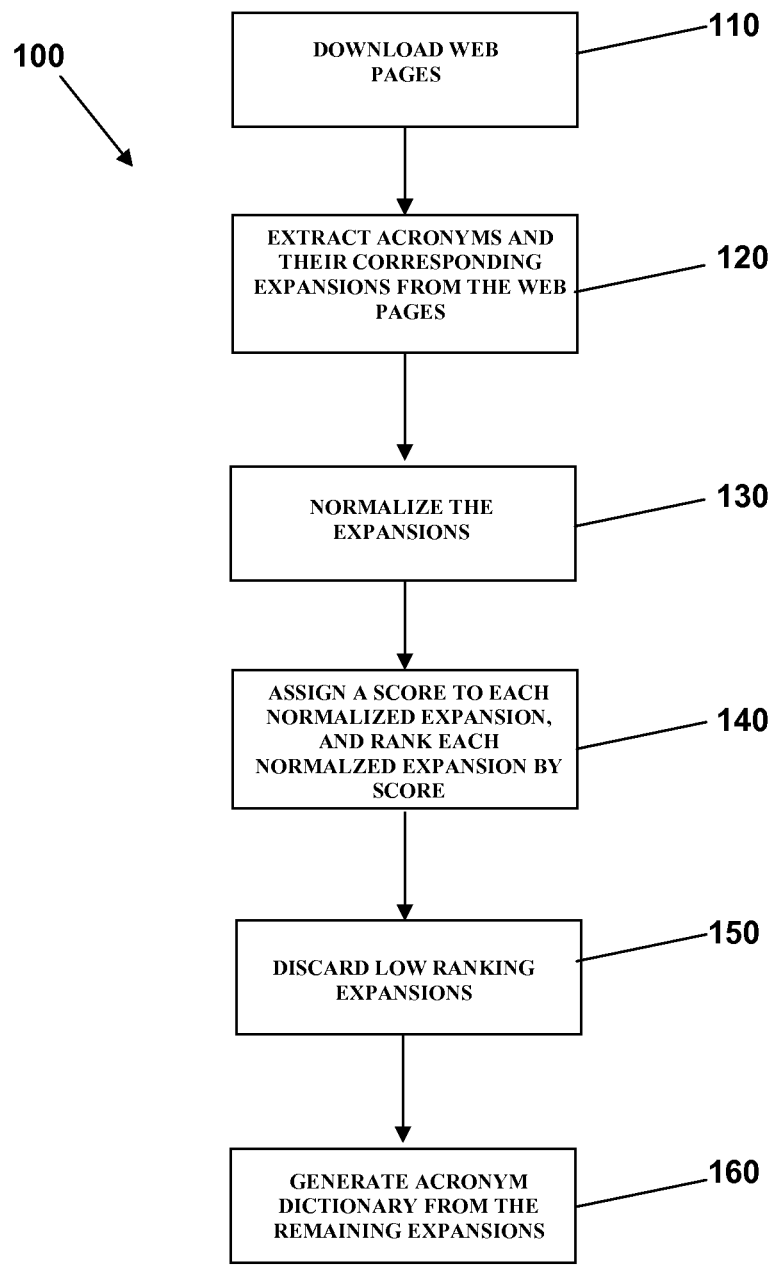
Figure 2:
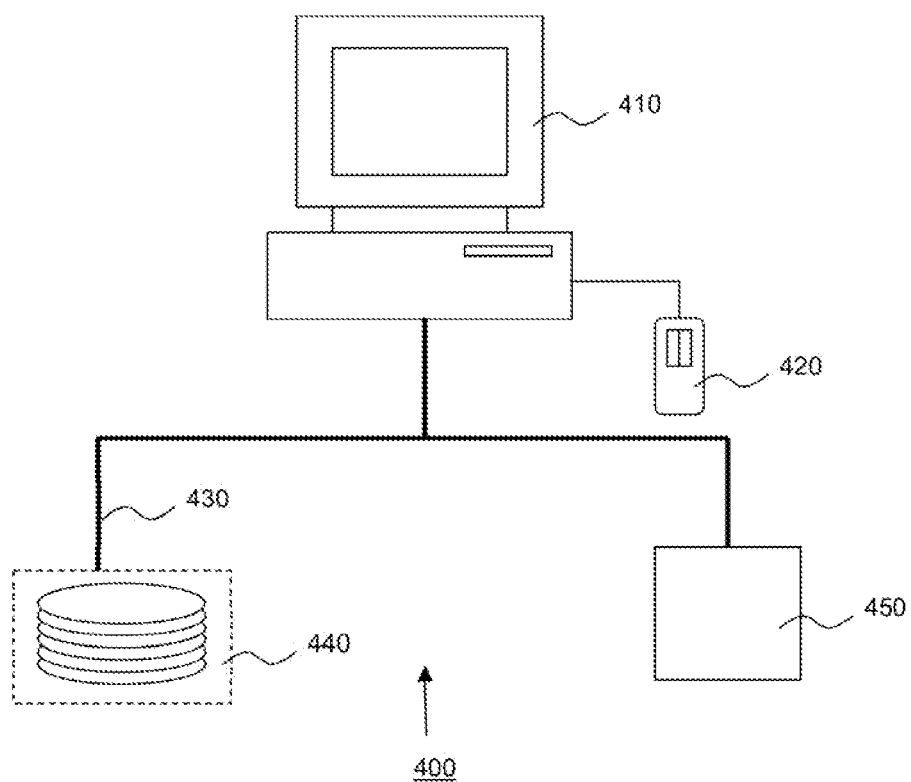

Embodiments are described in more detail and by way of non-limiting examples with reference to the accompanying drawings, wherein FIG. 1 is flow diagram of a computer-implemented method according to an embodiment; and FIG. 2 shows a data processing system in accordance with an embodiment.

DETAILED DESCRIPTION OF THE DRAWINGS

It should be understood that the Figures are merely schematic and are not drawn to scale. It should also be understood that the same reference numerals are used throughout the Figures to indicate the same or similar parts.

Proposed is a system and method for extracting an acronym and one or more corresponding expansions of the acronym from a document represented in a markup language. In particular, embodiments include: identifying at least one acronym contained in the document; determining one or more expansions of the at least one identified acronym based on a portion of document located proximate the identified acronym; determining a ranking for each determined expansion based attributes of the document; and selecting one or more expansions for an identified acronym using the determined rankings.

Embodiments can automatically and efficiently extract, normalize and rank acronym expansions from a plurality of documents such as web pages on a hosted on an organization's intranet. Different from plain text, web pages are created in a Markup Language, such Hypertext Markup Language (HTML) or eXtensible Markup Language (XML), and contain a rich set of features such as tags and links to other web pages or documents.

By utilizing the rich set of features of web pages and explicit or implicit context cues, the extraction and ranking of acronym expansions may be improved. Valuable features of web pages and documents represented in a markup language, such as tags and links, can be used to provide information about an acronym and its corresponding expansion, thus enabling improved accuracy and efficiency performance.

Embodiments are context-aware and can leverage two types of context information: words proximate an acronym; and link structure among linked electronic documents such web pages.

FIG. 1 shows a flow diagram of a computer-implemented acronym expansion method 100 according to an embodiment. Here the method is applied to web pages available on an organization's intranet network.

First, in step 110, a crawler (developed by Nutch and available to download at http://lucene.apache.org/nutch/), is used to download web pages in organization Intranet. Nutch is open source web-search software. It builds on Lucene Java, adding web-specifics, such as a crawler, a link-graph database, parsers for HTML and other document formats, etc. Next, in step 120, acronyms and their corresponding expansions are automatically extracted from the web pages using an extraction and expansion module. The expansions identified for each acronym are then normalized in step 130 using a normalization module. In step 140, the normalized expansions are then each assigned a score and ranked by score for each acronym. Low ranking expansions for an acronym are then discarded in step 150. Finally, in step 160, an acronym dictionary comprising acronyms and their corresponding expansions is generated from the remaining extracted and normalized expansions.

The above steps will now be described separately in greater detail.

Acronym Extraction (Step 120)

To automatically extract acronyms and associated expansions from web pages, candidate acronyms should be recognized with the text or markup language of the web page. In this embodiment, a string is considered as a candidate acronym if it satisfies the following three conditions:

(i) its length is between 2 and 10 characters;
(ii) it includes at least 2 capital letters; and
(iii) its first character is alphabetic or numeric or one of only four special characters: "/" "-" "." "&".

According to the above constraints, HP (Hewlett-Packard), HPLC (HP Labs China), 3D (3 Dimensions), U.S.A (United States of America), R&D (Research and Development), CD-ROM (Compact Disk-Read Only Memory) and I/O (Input/Output) are all regarded as candidate acronyms. The conditions are applied to make the extraction precise and efficient, although some common acronyms in lower case such as "btw" and "aka" are excluded. Exceptions to the condition can be defined such that if a string is embedded in one of the two standard HTML tags <abbr></abbr> or <acronym></ acronym> pairs, for example, the string is recognized as a candidate acronym without any constraints or conditions being imposed. Another exemplary condition may define that one or more predetermined terms are excluded from consideration as an acronym.

Once a candidate acronym is recognized, its associated expansion is extracted within its contexts (in other words, from text proximate the acronym). The context size defines how many words near the acronym are taken account of when determining an associated expansion and has a numerical value corresponding to the number of words before or after the acronym searched for the expansion. Here, the context size is the smaller value of: the length of the characters in the candidate acronym plus five; and the length of the text node that contains the candidate acronym.

Unlike conventional acronym extraction algorithms, each web page is processed twice in this embodiment.

In the first processing pass, a HTML web page is treated as a hypertext. A HTML parser parses the page content and a HTML DOM tree is built by the parser. For each text node in the DOM tree, if its XPath contains <abbr> or <acronym> tag, an acronym is extracted from this text node and associated expansion is extracted from "title" attribute of its parent node. Otherwise, the text in the node is tokenized by the space character. For each token in this text node, if it is an acronym candidate, its expansion is extracted by the following extraction algorithm (presented in pseudo code):

```
Input: an acronym and its context
for each character in an acronym from left to right
    if this character is punctuation, ignore it and continue;
    scan the characters in the context from left to right;
    if no matched character is found in its context
        extracted result ← null and exit;
    else
        continue;
until all characters in an acronym is checked
if all characters in an acronym are found in its context in order
    extracted result ← extracted acronym-expansion pair;
else
    extracted result ← null;
Output: extracted result
```

The extraction algorithm above describes how to extract associated expansion from its context for an acronym. The context includes the words to the left and right of the acronym candidate. In other words, a bi-directional candidate search technique is used to select terms near an acronym in order to enhance identification of acronym expansions. Because the left context case is very similar to the right one, only the right case is presented in the algorithm above.

The extraction algorithm is simple and efficient, since it only requires a few character comparisons. However, for improved accuracy, the algorithm may be constrained using the following rules:

(i) The first character of an acronym and the first character of its expansion must be same.

(ii) If each character of an acronym is the first character of each token in the context in order, the context is regarded as the expansion of this acronym.

Once rule (ii) is matched, an expansion is extracted from this context. Otherwise, the extraction algorithm presented in pseudo code above is used to extract the expansion. Rule (ii) is applied above check whether the context contains an expansion before the extraction algorithm presented in pseudo code is applied. This is because the extraction algorithm does not move on to find the next one once it finds a matched character in its candidate expansion.

In the second pass, a web page is transformed to plain text by removing all HTML tags. The acronyms embedded in <abbr>, <acronym>, <alt> and other tags are discarded when these tags are removed. The text is also tokenized using the space character. After all tokens are processed using an extraction algorithm as above, all acronym-expansion pairs are recognized. Finally, the extracted results of the two passes are combined together to get as many acronyms as possible.

It will be appreciated that embodiments process each web page twice. In a first pass, some web pages may not be correctly parsed by the HTML parser. For example, some text nodes may be discarded due to closing tags being missing in the web page. The second pass then detects and extracts those discarded in the first pass since the markup tags are disregarded. This combined extraction approach can therefore discover acronyms which are otherwise discarded in an individual pass.

Normalization (Step 130)

Embodiments group expansions that have the same meaning to an acronym. For example, both "Research and Development" and "Research & Development" are the expansions of "R&D". For this, two normalization algorithms are proposed.

The first normalization algorithm is based on direct string comparison and comprises the following steps for each acronym expansion:

(a) Change expansion to lower case.

(b) Replace all punctuation and stop words with a space character (c) Tokenize the expansion by decomposing text into string tokens or words.

(d) Stem each token.

(e) Combine all stemmed tokens in sequence to generate a canonical string.

(f) Create an entry in a hash table using the canonical string as a key and the original expansion as its value. If the key already exists in the hash table, the current expansion is appended.

After all expansions are processed, the expansions having the same meaning are grouped in the result hash table. This string comparison based normalization algorithm has high computing efficiency.

For improved accuracy, a second normalization algorithm is proposed, which is based on K-medoids clustering and comprises the following steps for each acronym expansion:

(a) Change expansion to lower case.

(b) Replace all punctuation and stop words with a space character (c) Tokenize the expansion by decomposing text into string tokens or words.

(d) Stem each token.

(e) Split each stemmed token into a set of three-character trigrams groups. For example, after "technical" is stemmed to "technic", it is broken into "tec, ech, chn, hni, nic" trigram set.

(f) Create a vector from the tri-gram set by first sorting all trigrams in alphabetical order and then denoting this by a vector (for example, "tec, ech, chn, hni, nic" is first sorted to "chn, ech, hni, nic, tec" and then denoted by a vector <chn, ech, hni, nic, tec>).

(g) Assign the weight of each element in the vector to an integer, e.g. 1.

All expansions are processed in the same way and mapped to vectors. The K-medoids clustering algorithm, described in book "Data Mining Concepts and Techniques", J. Han and M. Kamber, Morgan Kaufmann Publishers, Inc., 2001, is then applied to group expansions.

The k-medoids algorithm is a clustering algorithm related to the k-means algorithm and The medoidshift algorithm. Both the k-means and k-medoids algorithms are partitional (breaking the dataset up into groups) and both attempt to minimize squared error, the distance between points labeled to be in a cluster and a point designated as the center of that cluster. In contrast to the k-means algorithm k-medoids chooses datapoints as centers (medoids or exemplars).

Thus, k-medoid is a partitioning technique of clustering that clusters the data set of n objects into k clusters known a priori. A useful tool for determining k is the silhouette. It is more robust to noise and outliers as compared to k-means.

A medoid can be defined as the object of a cluster, whose average dissimilarity to all the objects in the cluster is minimal i.e. it is a most centrally located point in the given data set.

In summary, the idea behind K-medoids is as follows: The initial representative objects (or seeds) are chosen arbitrarily. The iterative process of replacing representative objects by non-representative objects continues as long as the quality of the resulting clustering is improved. This quality is estimated using a cost function that measures the average dissimilarity between an object and the representative object of its cluster.

To reduce the number of similarity comparisons compared to the original K-medoids clustering algorithm, which computes similarity between every pair of expansions, a cosine measurement may be used to compute the similarity between two expansions. At the beginning of clustering, the expansion with the largest score is chosen as the initial cluster. Then, the other expansions are compared to this expansion by cosine measurement. If the similarity exceeds a threshold value, the expansion is clustered into the initial cluster. Otherwise, a new cluster is created. This process is then repeated until all expansions are grouped. Investigations have shown that 0.7 is a suitable threshold value.

Ranking (Step 140)

It is common for acronyms to have multiple expansions, even within a digital library or document database of a single organization. For example, 10 possible expansions for "ABC" were found from 656,350 intranet web pages of a large organization.

To discriminate the expansions for an acronym, a score is assigned to each expansion and then the expansions are ranked according to their score. After ranking the expansions, the expansion(s) having the most dominant meaning of an acronym can be identified. Lower ranked expansions may be incorrect due to typos or incorrect extraction and can be filtered out.

The ranking algorithm makes use of context cues implied in web pages while scoring expansions. There are two kinds of context; local context and global context. The local context is the text around or proximate an acronym within a page. The global context is the links among the web pages in a website or network.

First, a local score for every expansion is calculated based on the local context. A set of scoring rules can be used for defining how a local score is generated. An exemplary set of localscore scoring rules is listed in table 1 below:

TABLE 1

| Localscore Scoring Rules | Localscore |
|---|---|
| If an expansion is embedded in <abbr> or <acronym> tag | +10 |
| If some special patterns are matched: "E(A)", "A(E)", "E:A", "E = A" and "E-A", where A = Acronym and E = Expansion | +5 |
| If some special syntactic information is matched, such as "A stands for E", "E is also known as A", "A short for E", "A is E", "A refers to E", and "A, see E" | +5 |

TABLE 1-continued

| Localscore Scoring Rules | Localscore |
|---|---|
| If the first letter in each token of an expansion match a letter in its acronym in order | +1 |
| If expansion is embedded in or tag | +0.5 |
| Each stop word in an expansion | −0.5 |
| Each punctuation character in an expansion | −0.5 |
| Compare the length of expansion (in term of the number of words) and its acronym (in term of the number of characters), each additional word | −0.5 |
| Each extra word between the acronym and the expansion | −0.5 |

Using the localscore scoring rules, such as those in Table 1 above, a localscore can be calculated.

The algorithm proposed by L. Page, S. Brin, R. Motwani, and T. Winograd, "The pagerank citation ranking: Bringing order to the web," in Technical report, Stanford University Database Group, 1998, is then used to compute a PageRank value of each web page for use as an indicator of the quality of a page. The quality of the page is in turn used to help decide the quality of expansions extracted from the web page. The potential expansions extracted from a high quality web page are typically more reliable than from ones with poor quality.

The final score (globalscore) of this expansion in the whole corpus is calculated using the following formula (1):

$$globalscore = \sum_{i=1}^{n} (localscore_i \times pr_i), \quad (1)$$

wherein pr is the PageRank value of the web page from which the acronym-expansion is extracted and n is the number of the web pages containing this expansion. Thus, it will be appreciated that both the local and the global cues are taken into account by the formula (1).

The local and the global context are then used together to rank the expansions in order of globalscore. By ranking the expansion in order, incorrect expansions such as those with the lowest globalscore can be filtered out (Step 150).

Turning now to FIG. 2, a data processing system 400 in accordance with an embodiment is shown. A computer 410 has a processor (not shown) and a control terminal 420 such as a mouse and/or a keyboard, and has access to an electronic library or document database stored on a collection 440 of one or more storage devices, e.g. hard-disks or other suitable storage devices, and has access to a further data storage device 450, e.g. a RAM or ROM memory, a hard-disk, and so on, which comprises the computer program product implementing a method according to an embodiment. The processor of the computer 410 is suitable to execute the computer program product implementing a method in accordance with an embodiment. The computer 410 may access the collection 440 of one or more storage devices and/or the further data storage device 450 in any suitable manner, e.g. through a network 430, which may be an intranet, the Internet, a peer-to-peer network or any other suitable network. In an embodiment, the further data storage device 450 is integrated in the computer 410.

It will be appreciated that embodiments provide advantages which can be summarized as follows:

Unlike human-edited systems, proposed embodiments are automatic and, hence, do not require excessive human effort in order to create and maintain acronym listings/dictionaries.

Embodiments utilize a rich set of features of hypertext and explicit or implicit context cues to help extract, normalize and rank acronym-expansions. Experimental results show that by using these features, significant performance improvements can be achieved.

Organization-specific or network-specific acronyms expansions can be collected and indexed. Many special acronyms used in an organization are not collected into the general-purpose acronym dictionaries because of their limited coverage.

The string-comparison-based normalization algorithm has improved efficiency because each expansion only need be scanned once. The computation complexity is O(n), where n is the number of expansions. Thus, embodiments may be suitable for application with large numbers of web pages that require huge computing resource.

It should be noted that the above-mentioned embodiments are illustrative, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. Embodiments can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method comprising:
examining a document represented in a markup language to identify acronyms contained therein, wherein the examining comprises:
performing a first stage comprising:
parsing the document using a markup language parser to identify a text node;
identifying an acronym in the text node; and
performing a second stage after the first stage, the second stage comprising:
transforming the document represented in the markup language into plain text by removing markup language tags from the document;
identifying a further acronym in the plain text, the further acronym being in addition to the acronym identified in the first stage;
retrieving portions of the document for the respective identified acronyms, wherein each of the portions is located within the document proximate the respective one of the identified acronyms;
determining one or more expansions of each of the identified acronyms based on the corresponding retrieved document portion;
determining a ranking for each expansion based on attributes of the document; and
selecting expansions for the identified acronyms using the determined rankings.

2. The method of claim 1, wherein identifying the further acronym in the plain text comprises determining a grammatical classification of each term within the plain text to enable identification of an acronym.

3. The method of claim 2, wherein determining the grammatical classification comprises examining a text term within the plain text and determining compliance of text term attributes with conditions in order to identify that the text term is an acronym, and wherein said conditions relate to at least one of:
a length of the text term being within a particular range;
an amount of capitalization within the text term;
the presence of a special character within the text term; and
the text term being a predetermined term excluded from consideration as an acronym.

4. The method of claim 1, wherein the retrieving comprises selectively decomposing terms within at least one retrieved document portion into individual sub-terms to facilitate identification of an expansion within that retrieved document portion.

5. The method of claim 1, wherein the determining one or more expansions comprises identifying terms within each retrieved document portion that include an initial portion containing a first character of the corresponding acronym and producing a corresponding set of terms for each identified term including said identified term and following terms within the retrieved document portion.

6. The method of claim 1, wherein the determining the ranking utilizes an algorithm considering attributes of the markup language of the corresponding retrieved document portion and an indicator of the reliability of the document.

7. The method of claim 6, wherein the algorithm determines compliance of attributes of the markup language with rules, and wherein said rules relate to at least one of:
the presence of predetermined markup tags;
the presence of one or more special characters;
the presence of predetermined text indicating an expansion of an acronym.

8. An apparatus comprising:
a non-transitory computer-readable medium storing a computer program; and
at least one processor, the computer program executable on the at least one processor to:
examine a document represented by a markup language to identify acronyms contained therein, the examining comprising:
performing a first stage comprising parsing the document using a markup language parser to identify a text node, and identifying an acronym in the text node; and
performing a second stage after the first stage, the second stage comprising transforming the document represented in the markup language into plain text by removing markup language tags from the document, and identifying a further acronym in the plain text, the further acronym being in addition to the acronym identified in the first stage;
retrieve portions of the document for the respective identified acronyms, wherein each of the portions is located within the document proximate the respective one of the identified acronyms;
determine one or more expansions of each of the identified acronyms based on the corresponding retrieved document portion;
determine a ranking for each expansion based on attributes of the document; and
select expansions for the identified acronyms using the determined rankings.

9. The apparatus of claim 8, wherein the determining of the one or more expansions of each identified acronym comprises identifying terms within each retrieved document portion that include an initial portion containing a first character of the corresponding acronym and producing a corresponding set of terms for each identified term including said identified term and following terms within the retrieved document portion.

10. The apparatus of claim 8, wherein the ranking utilizes an algorithm considering attributes of the markup language of the corresponding retrieved document portion and an indicator of the reliability of the document.

11. A non-transitory computer readable medium storing a computer program executable in a computer to:
- examine a document represented in a markup language to identify acronyms contained in the document, the examining comprising:
  - performing a first stage comprising:
    - parsing the document using a markup language parser to identify a text node;
    - identifying an acronym in the text node; and
  - performing a second stage after the first stage, the second stage comprising:
    - transforming the document represented in the markup language into plain text by removing markup language tags from the document;
    - identifying a further acronym in the plain text, the further acronym being in addition to the acronym identified in the first stage;
- retrieve portions of the document for the respective identified acronyms, wherein each of the portions is located within the document proximate the identified acronym;
- determine one or more expansions of each of the identified acronyms based on the corresponding retrieved document portion; and
- select expansions for the identified acronyms.

* * * * *